May 26, 1925.  1,538,985

O. V. GREENE

GAS CLEANING APPARATUS

Filed Aug. 17, 1921   3 Sheets-Sheet 1

INVENTOR.
Oscar V. Greene
BY
ATTORNEYS

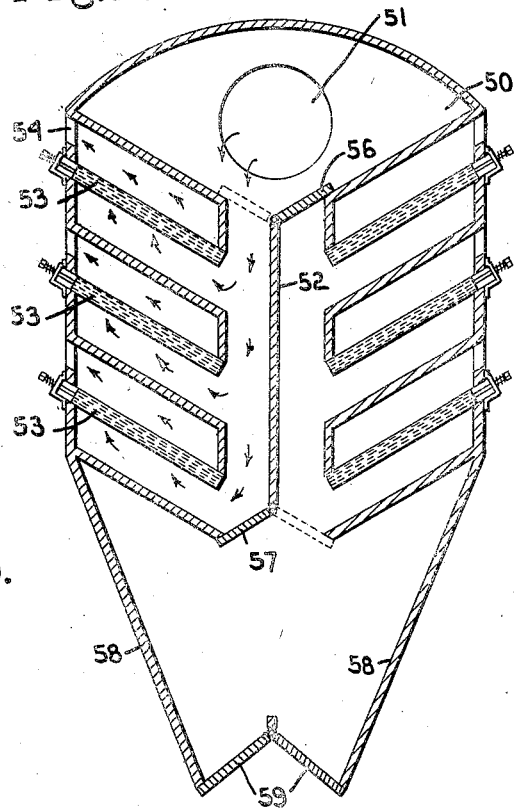
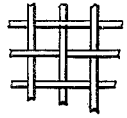
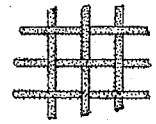
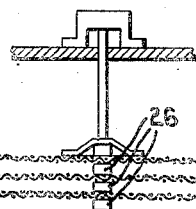
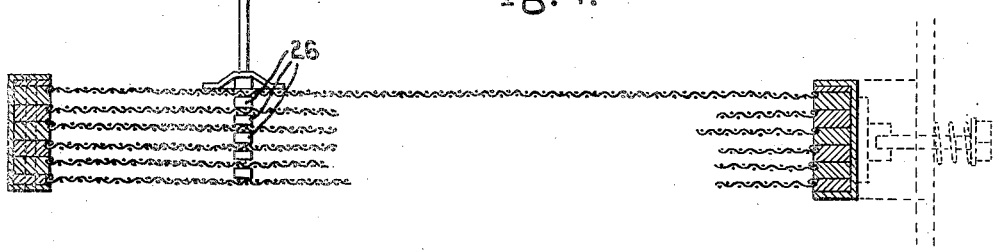

May 26, 1925.
O. V. GREENE
1,538,985
GAS CLEANING APPARATUS
Filed Aug. 17, 1921    3 Sheets-Sheet 3
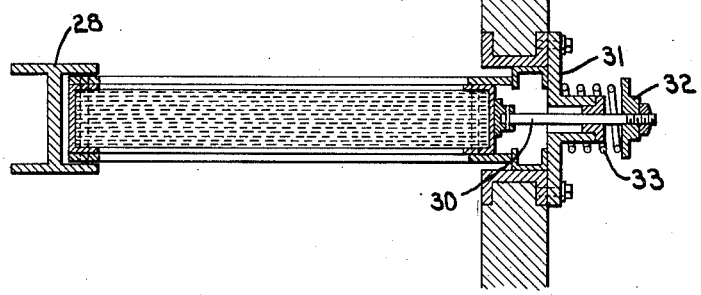
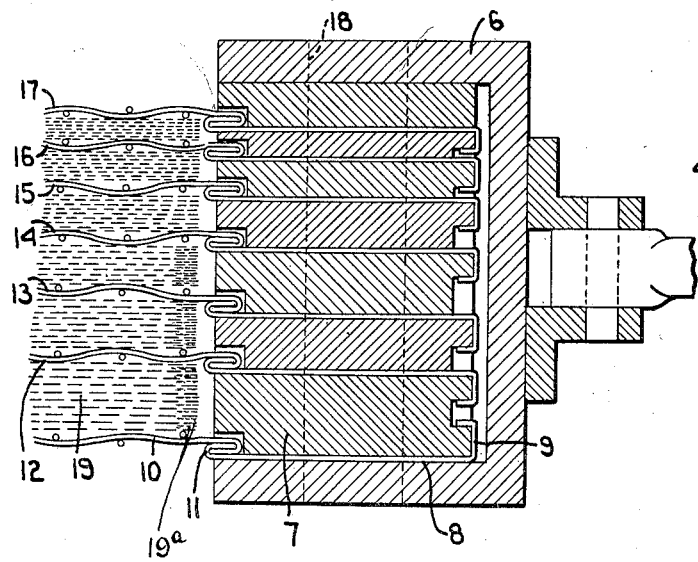
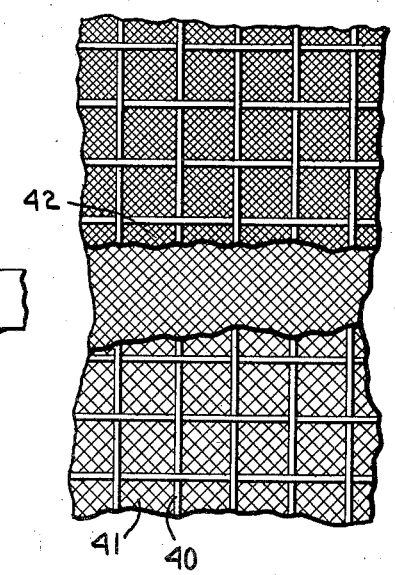
INVENTOR.
Oscar V. Greene
BY
ATTORNEYS Patented May 26, 1925.

1,538,985

UNITED STATES PATENT OFFICE.

OSCAR V. GREENE, OF CLEVELAND, OHIO.

GAS-CLEANING APPARATUS.

Application filed August 17, 1921. Serial No. 493,160.

*To all whom it may concern:*

Be it known that I, OSCAR V. GREENE, a citizen of the United States, and a resident of Cleveland, county of Cuyahoga, and State of Ohio, have invented a new and useful Improvement in Gas-Cleaning Apparatus, of which the following is a specification, the principle of the invention being herein explained, and the best mode in which I have contemplated applying that principle so as to distinguish it from other inventions.

The present improvements, relating, as indicated, to gas cleaning apparatus, have more particular reference to mechanism or apparatus designed for cleaning air and other gases from fine particles of dust carried thereby particularly in the cleaning of the hot gas from metallurgical furnaces and the like. In the latter considerable difficulty has been experienced in separating out the particles of fume because of their tendency to clog the filtering means and prevent the further passage of gas. The primary object of the present invention therefore is to provide an improved construction of filter for use in this connection which will, in the first place, decrease the tendency to clog, and which will, in the second place, be adapted for convenient cleaning and for convenient and quick removal for either repairing, cleaning or replacement. A further object of this invention is to provide an improved filtering medium and a method of preparing the same for use in an apparatus of the type referred to above. A further object of the invention is the provision of an improved method of preparing the filtering element for use. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1:
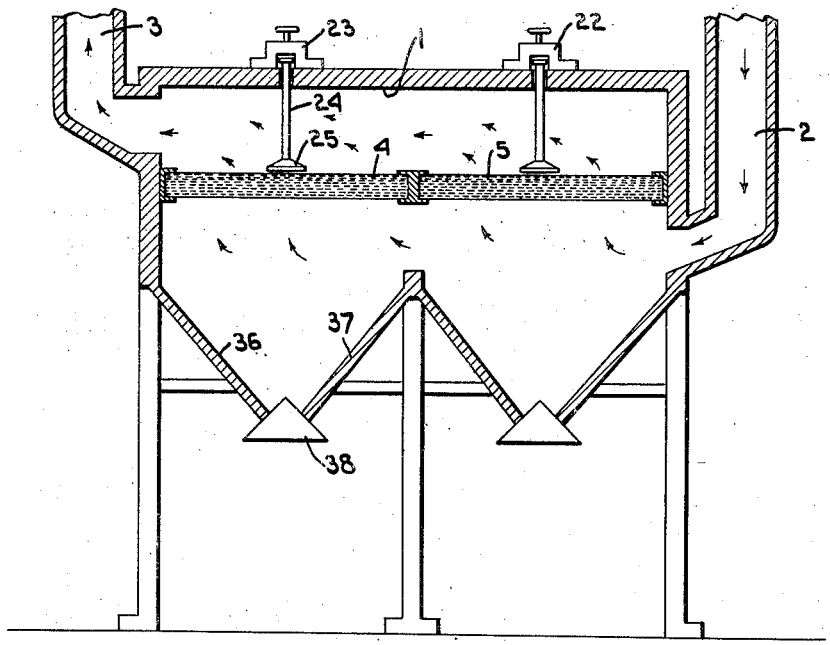
Figure 3:
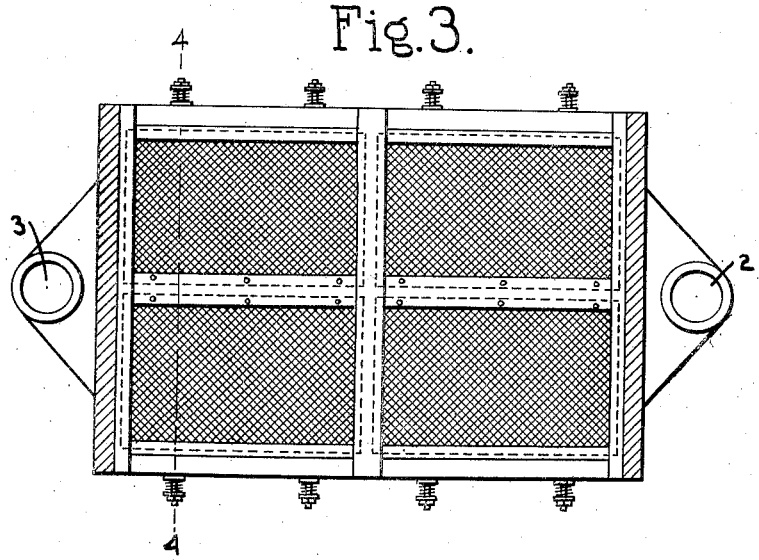

Fig. 1 is a transverse vertical section through a gas cleaning apparatus embodying the present invention; Fig. 2 is a similar view showing a modified form of such apparatus; Fig. 3 is a plan view of the dust cleaning elements of the apparatus of Fig. 1; Fig. 4 is a section on the line 4—4, Fig. 3; Fig. 5 is an enlarged view showing the means for connecting the various screening elements to the frame; Fig. 6 is a plan view partly broken away, illustrating the mounting of the successive screens; Fig. 7 is a transverse sectional view illustrating the screens and jarring mechanism; Fig. 8 is a plan view of a portion of a woven wire screen when prepared for treatment; and Fig. 9 is a similar view showing the screen after being treated to present a roughened dust-collecting surface.

I have found that in gas cleaning apparatus in which metal in fine strands or shavings is employed as a filtering medium, the temperature to which the mechanism is subjected soon draws the temper from the metal and practically anneals it so that it becomes a dead mass. When this dead mass of metal has become coated and clogged with the collected dirt it is practically impossible to clean it of this dirt by jarring it or vibrating it, as there is relatively no resiliency or springiness in it, whether in the form of woven wire screens or metal shavings. In the present apparatus, therefore, I have devised a means for holding the metal in such a way that a certain amount of resiliency will always be maintained and will be present to assist in the cleaning action when the device is jarred or vibrated for the purpose of knocking loose the particles which clog and adhere to the surface of the metal.

In Fig. 1 I have shown a gas cleaning chamber 1, to which the gas is introduced through a conduit 2, and from which it is removed or allowed to escape through a conduit 3 on the other side. Mounted horizontally in this chamber, between the levels of the intake conduit 2 and the outlet conduit 3, are two filtering elements 4 and 5. Each of these filtering elements consists of a series of woven wire screens, which are shown in section in Fig. 4, and upon an enlarged scale in Fig. 5. Referring to Fig. 5, there is shown a channel member 6, which receives a series of plates or blocks 7. To each of these spacing blocks 7 there is attached a hook-shaped member 8 which is provided with an inturned flange portion 9, engaging around and against the outer edge of the spacing element, and secures the transversely extending wires 10 of a strip of woven wire screen in its outer edge which is also bent inwardly and flanged at 11. Various other hook-shaped strips 8 are mounted on the other spacing blocks, the blocks being so proportioned that the screens 10, 12, 13, 14, 15, 16 and 17 are spaced at various distances from each other when held in these blocks. The blocks are retained in the channel members 6 by means of removable bolts 18, and on the removal of these bolts the various screens and spacing blocks may be removed and new screens substituted.

It is evident that these spacing blocks may be very thin enabling the screens thus held to be placed close together, with little or no additional filtering material between them. However, on account of lower construction cost, it is preferred to place woven wire filter screens of suitable degrees of fineness and roughness (19) between screens 12 to 17. In turn, each of these filter screens is separated from the adjacent screens by either a screen of relatively large mesh or by a narrow frame of suitable material around the edges (19ª) of the individual screens. This is done in order to preserve the percentage and uniformity of opening of the entire filter as determined by the mesh of the filter screen used.

Mounted in the upper wall or top of the gas chamber 1 are electro-magnetically operated jarring devices 22, each of which consists of an electro-magnet 23 and an armature, the armature being connected to a post 24 provided with a broadened flat foot 25 which contacts the uppermost tensioned screen 17. If desired, blocks 26 may be interposed between the various tensioned screens and in line with the post 24 and foot 25 in order to insure proper transmission of the vibrations through the various tensioned screens of the series.

The channel members 6 are held at one side, which, in the view shown in Fig. 1, is the inner edge which is at the middle of the gas chamber, in an I-beam 28, which merely serves as a rest. At either end the holders or channels 6 are attached to a rod 30, which extends externally of the gas chamber through an opening in a removable flange 31 bolted to the chamber wall where they are attached to a flange or head 32. Between this head 32 and the removable flange 31 is a heavy coiled spring 33 which serves to maintain the screens which are fastened in the spacing blocks and in the channel 6 under a constant tension. These springs are mounted externally of the gas chamber and are not subjected to the high temperatures within, and accordingly they maintain their resiliency and maintain the screens under tension even though the resiliency of the wires in the screens has been injuriously affected or to a great extent destroyed by the action of the hot gases passing through the screens.

Directly beneath the two series of screens 4 and 5, shown in the apparatus of Fig. 1, are mounted two hoppers with inclined sides 36 and 37, open at their bottoms, the openings being closed by means of a valve or bell 38. Upon vibrating the screen through the jarring apparatus already described, the fume and dust collected in the screen is knocked loose and is allowed to fall into these hoppers and may then be discharged from the hoppers at suitable intervals.

I consider it better to use woven screens in preference to any other form of metal between the tensioned screens for reasons given farther on, and I preferably employ a series of woven wire screens, such as are shown in Fig. 6, arranging them so that the wires of the successive screens lie at different angles to each other. In Fig. 6 I have shown one screen 40 of relatively coarse mesh, which may represent one of the tensioned screens, beneath which is a screen 41, having its wires lying at an angle of 45 degrees to those of the screen 40. Beneath this screen 41 is another and finer screen having its wires lying parallel with those of screen 41, while beneath that is still another screen 42 with its wires lying at angles of 45 degrees, respectively, with the wires of the uppermost screen 40. In this way the gas passages through the screen are made as winding and tortuous as possible, and the maximum amount of wire surface is presented uniformly to the passage of the gas.

By mounting a series of screens between the tensioned screens, and by mounting the latter in the spacing blocks which are removably clamped in the channel members 6, it is possible to remove bodily a worn-out series of screens and replace them with a new series, and this can be done very quickly and conveniently.

In Fig. 2 I have shown a modified form of gas chamber 50, in which the gas enters through a lateral opening 51, and then passes down on one side or the other of a central partition 52. The gas then passes laterally and upwardly through a series of filters 53, each of which is constructed in accordance with the series of screens shown in Figs. 4, 5 and 6, so that the screens may be removed as a unit. After passing through these screens 53 the gas passes laterally out of the gas chamber through openings 54, and is then collected in a manifold, (not shown). In this form of chamber I employ two doors or valves 56 and 57 which operate in unison, either to open the left-hand portion of the chamber at the top and to close it at the bottom, or to open the right-hand portion of the chamber and close it at the bottom. In the figure shown the left-hand chamber is opened to the passage of gas and the right-hand chamber is open at the bottom for the removal of the dust and fume which are removed from the screens by vibrating the same in the manner previously described and allowing the dirt to drop from this chamber into the hopper bottom 58 of the gas chamber, which is closed ordinarily by means of two gates or valves 59.

The reasons why I prefer woven metal screens in preference to other forms of metal are as follows.

It is apparent that uniformity of opening is one of the prime essentials in a filter of the kind in question. It is because woven screen affords the most uniform filter mass that it is preferred to other mediums, such as metal shaving or unwoven tangled metal strands more or less compacted in a matt. When matted material of the character mentioned is employed, it is practically impossible to get perfect uniformity in openings throughout the matt. When the material comes in layers and these layers are superposed upon one another to form the complete filter the smallest openings, and consequently the greatest friction with its attendant greater dust accumulating ability, is at the contact surfaces of the layers. Again, a cross section of a matt made up of such layers of tangled strands will disclose a condition of irregular density, due to the inability of distributing the strands uniformly during manufacture of the layers.

Another feature of important superiority of woven screen over tangled strands, is the ability in the former of maintaining the uniform condition. The jarring to which the filters are subjected in order to knock out the accumulated dust or fume, causes the tangled strands to disintegrate and fall out where they contact with the sides of the metal container, resulting sooner or later in openings for the gas to short circuit the filter and pass through carrying the dust with it.

This condition is under perfect control when woven screens are used and a seal can always be maintained preventing the short circuiting—resulting in a more satisfactory cleaning operation.

It is also of great importance that the filtering medium be properly prepared and constructed to present as rough a surface as possible to the dust or fume laden gas.

The rougher the surface, the greater will be the friction of the dust or fume particles on the surface and the greater the deposit thereof. It has been found that a filter of this description works more effectively after it has received a coating of dust. The roughened surface aids in the rapid accumulation of the dust coating and also prevents the coating from coming off during shaking or jarring periods, as contrasted to the opposite tendency associated with the relatively smooth surface of the unaltered or untreated filtering medium. I provide such a medium by first cleaning the screens, either by pickling them in suitable acids or by sand blasting. This treatment gives a clean surface to the metal after which it may be treated to provide a rough coating over the surface of the metal, which not only increases to a great extent the capacity of the wire to collect dust and other materials, but also—when iron or steel is used—prevents the rusting of the wire either before use or during use. Various methods may be employed to provide this coating on the steel or iron wire but preferably the wire is submitted to the action of carbon-monoxide gas and super-heated steam in the presence of a high temperature. This surface coating of magnetic oxide of iron is rough and therefore capable of catching and retaining the dust particles and also has a certain magnetic attraction for particles of magnetic ore (or partially reduced hematite) which may pass thereover, which in turn increases the relative roughness and efficiency of the filter for non-magnetic dust or fume.

In the handling of hot gas from ferro-furnaces in which there is present super-heated steam, and carbon monoxide, the collecting of the particles of dust on the screen is assisted by a chemical reaction which takes place between the clean iron of the filtering medium and the steam and monoxide gas. The carbon monoxide and the super-heated steam at the temperature which is present when the gas passes through the screen attack the rough surface thereof and convert the surface into a magnetic oxide of iron. This magnetic oxide of iron on the surface of the filtering medium in turn attracts the very fine particles of magnetic ore which come over with the gas from the furnace and in this way the collecting or catching of these particles in the gas is facilitated by the chemical reaction which has already taken place on the iron of the filtering medium.

As previously stated, the filter action of the screen or metal wool is increased if they be cleaned prior to use either by pickling or sand blasting, preferably the latter, and is again increased if the metal be subjected to some treatment which will preliminarily effect the conversion of the surface of the metal to the magnetic oxide of or ferric-ferrous phosphate iron for the purpose referred to above. If the wire be left to the action of the furnace gas for this reaction, a coating of magnetic oxide will be formed on the surface of the filtering metal which is comparatively light due probably to the presence of diluents in the form of carbon dioxide and nitrogen, the latter of which forms the greater portion of the elements in the gas.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A gas filter comprising a frame, a plurality of relatively coarse woven wire screens mounted therein under tension; a plurality of other finer screens mounted upon and between said tensioned screens, and means adapted to jar said screens.

2. A gas filtering element, comprising a plurality of woven steel or iron wire screens superimposed upon each other, and a number of said screens having the wires thereof provided with a coating of magnetic oxide of iron.

3. In a method of preparing wire for use as a gas filter, the steps which consist in sand blasting the surface of said wire, and then converting the surface thereof into magnetic oxide of iron.

4. A gas filter comprising a casing provided with inlet and outlet openings, a frame mounted in said casing between said openings, a plurality of woven wire screens removably mounted in said frame, and means mounted exteriorly of said casing and co-operating with said frame, said means being adapted to maintain said screens under tension while in said frame.

5. A gas filter comprising a casing provided with inlet and outlet openings, a frame mounted in said casing between such openings, a plurality of woven wire screens mounted in said frame, and means disposed exteriorly of said casing, said means co-operating with said screens to maintain the same under tension.

6. A gas filter comprising a casing provided with inlet and outlet openings, a frame mounted therein between said openings, a filtering means comprising a series of woven wire screens mounted together in close relation in said frame, said means being removable as a unit therefrom, and means normally maintaining said screens under tension.

7. A gas filter comprising a casing provided with inlet and outlet openings, a frame disposed therein between such openings, said casing having an opening in one wall adjacent said frame. a filtering means comprising a series of parallel adjacent screens, means maintaining said screens in such relation, said means being normally received in said frame in said casing and being bodily removable through the opening adjacent thereto in the wall of said casing, and means removably mounted over such last-named opening in the wall of said casing to seal the same, said means being provided with members engaging said means and maintaining the same under tension while said means engages and seals the opening in the wall of said casing.

Signed by me this 3rd day of August, 1921.

OSCAR V. GREENE.